April 7, 1959 W. C. GILE ET AL 2,881,023
CAMPING AND BOAT TRANSPORTING TRAILER
Filed Dec. 6, 1957 5 Sheets-Sheet 1
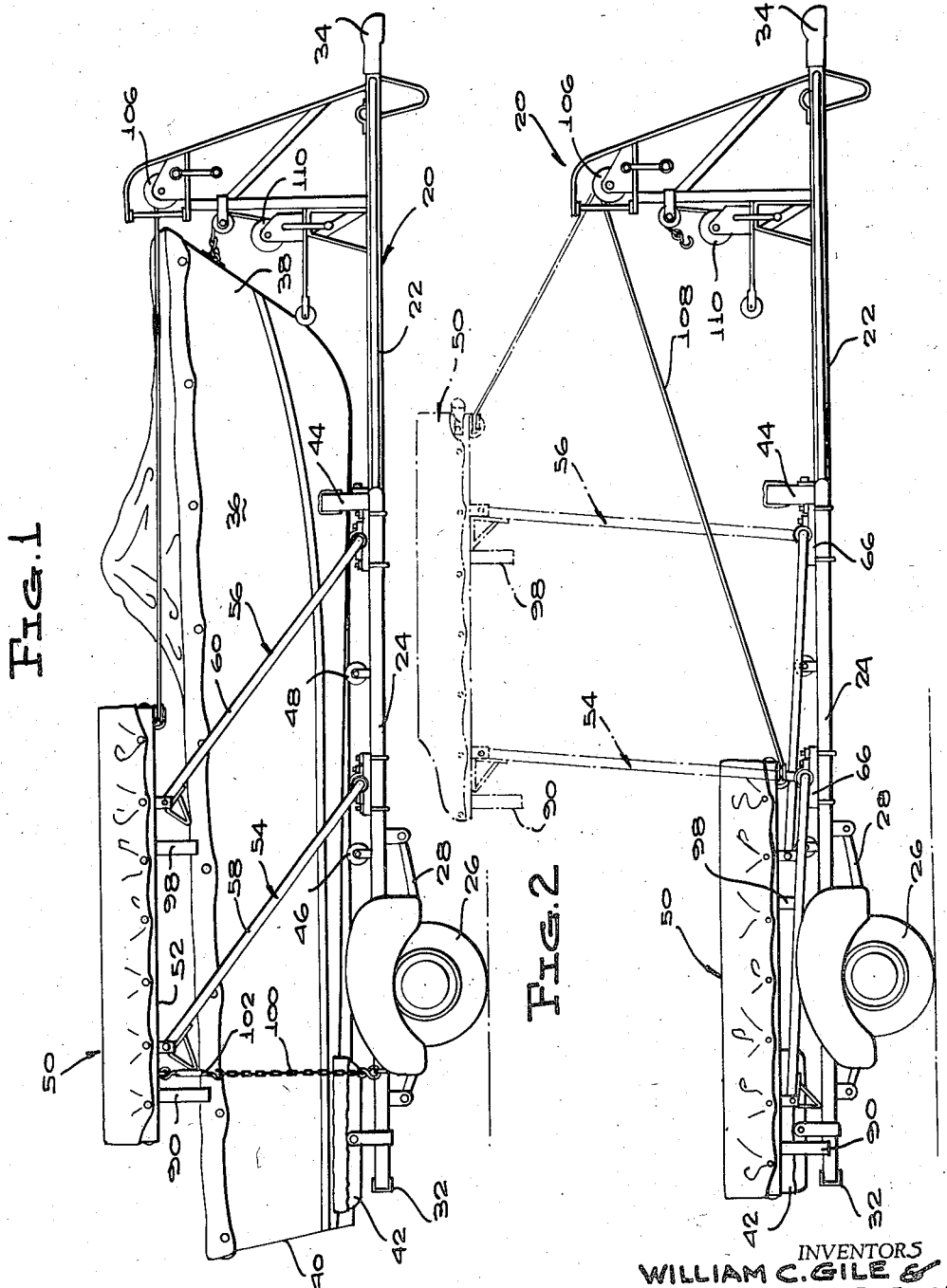
INVENTORS
WILLIAM C. GILE &
MAURICE E. NELSON
BY
McMorrow, Berman + Davidson
ATTORNEYS

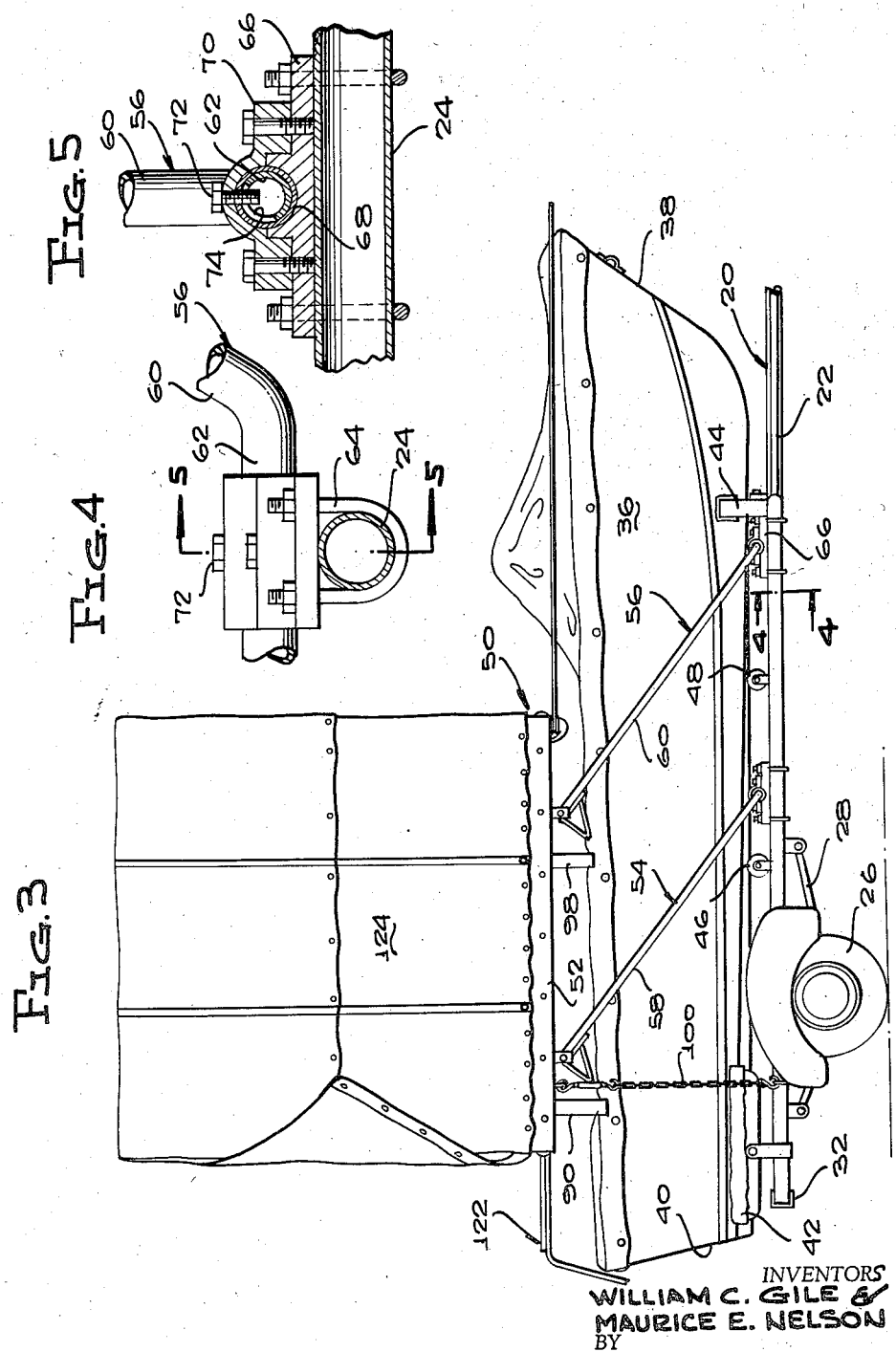

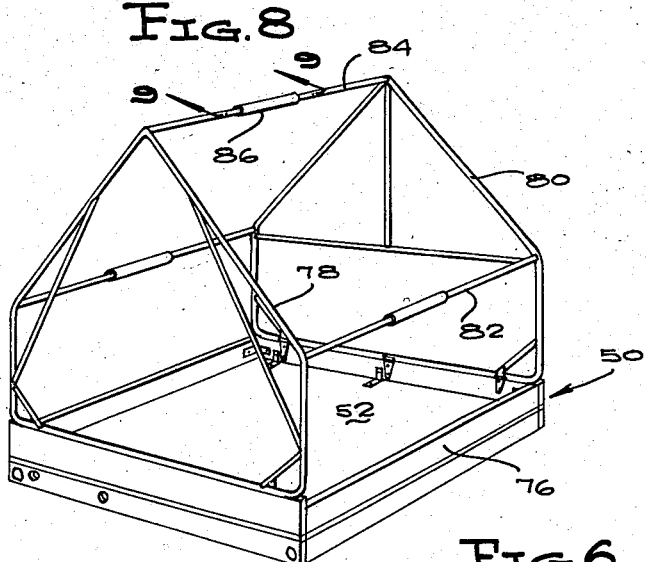
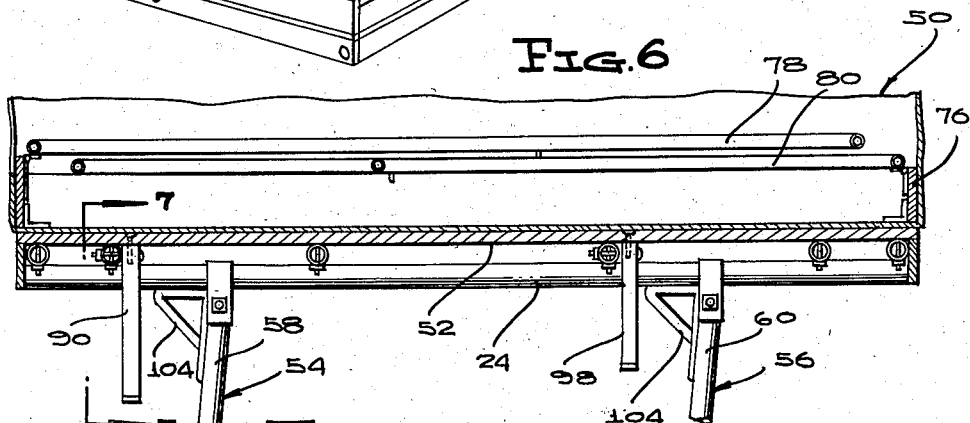
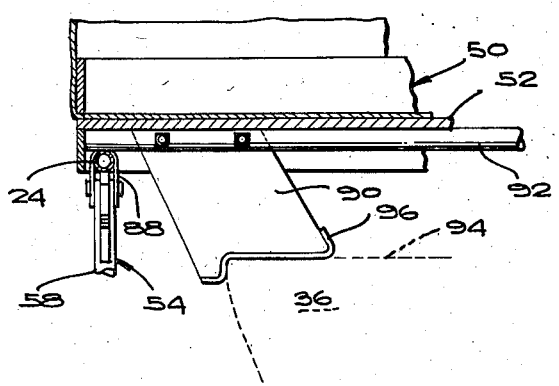

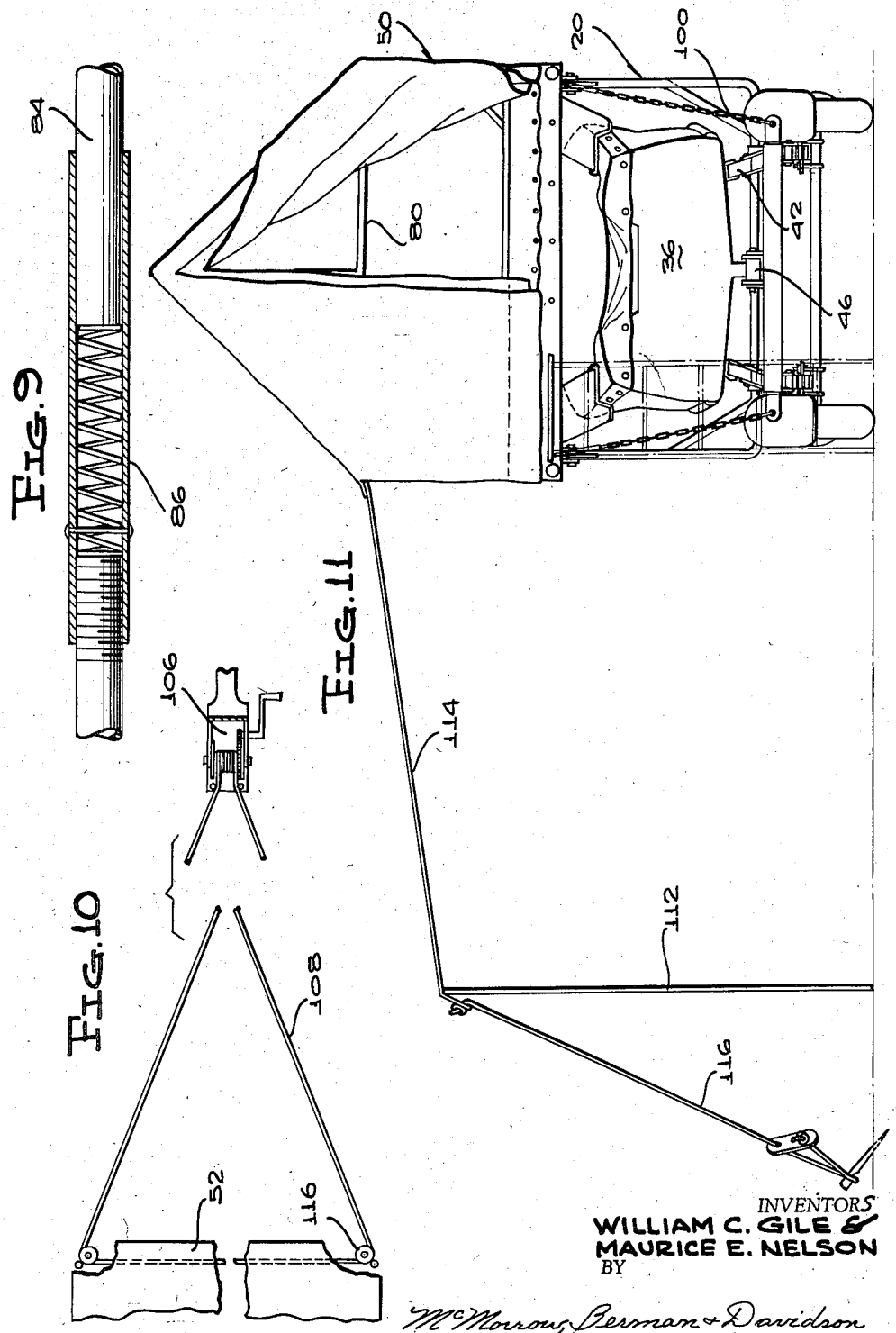

April 7, 1959  W. C. GILE ET AL  2,881,023
CAMPING AND BOAT TRANSPORTING TRAILER
Filed Dec. 6, 1957  5 Sheets-Sheet 5
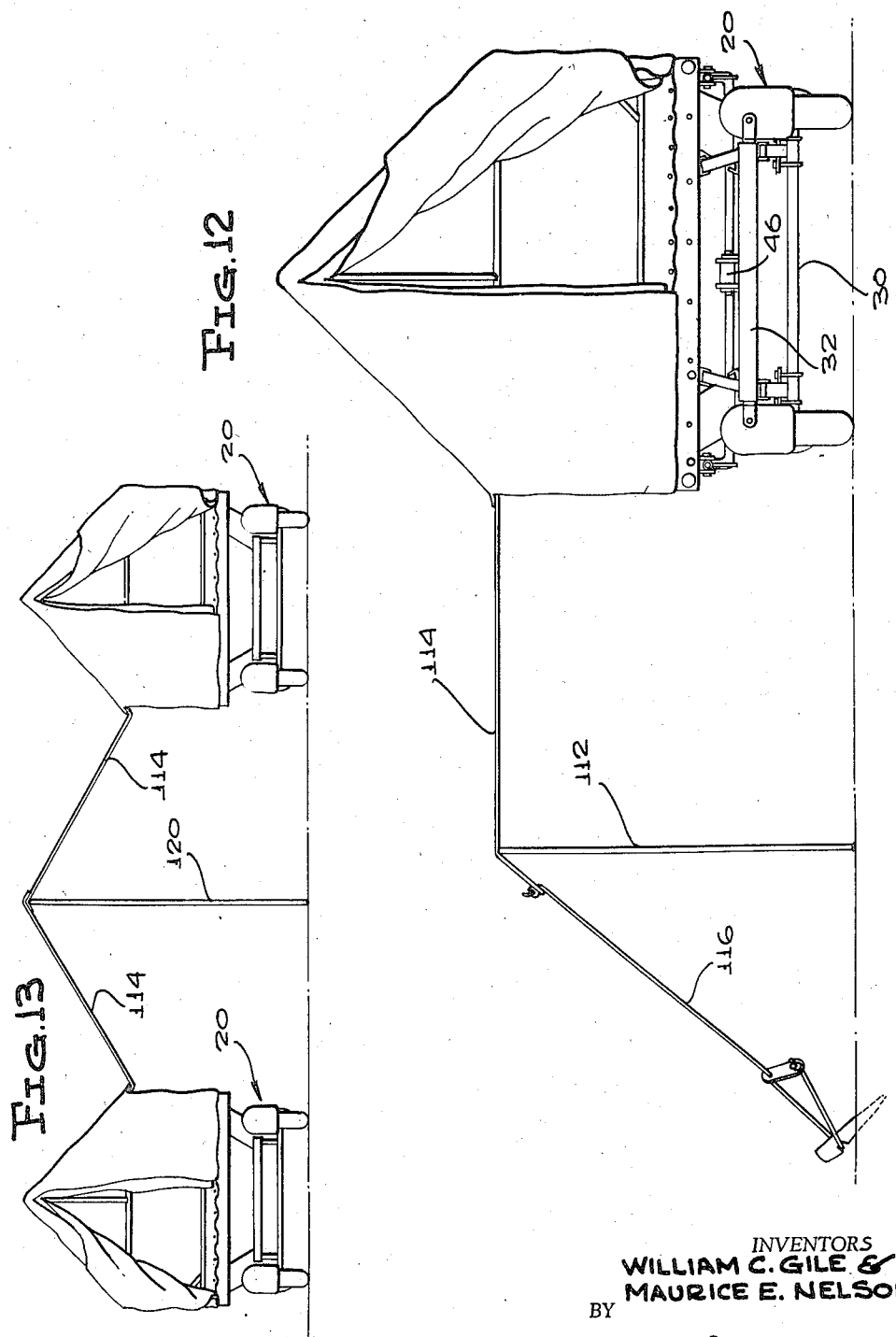
INVENTORS
WILLIAM C. GILE &
MAURICE E. NELSON
BY
McMorrow, Berman & Davidson
ATTORNEYS

United States Patent Office 2,881,023
Patented Apr. 7, 1959

2,881,023

CAMPING AND BOAT TRANSPORTING TRAILER

William C. Gile and Maurice E. Nelson, Agawam, Mass.

Application December 6, 1957, Serial No. 701,074

5 Claims. (Cl. 296—23)

The present invention relates to a camping and boat transporting trailer.

An object of the present invention is to provide a camping and boat transporting trailer which lends itself to ready transport over a roadway, one which enables the user thereof to transport a tent and other camping equipment along with a boat on a single trailer with the tent available for use without demounting the boat from the trailer, and which is highly effective in action.

Another object of the present invention is to provide a camping and boat transporting trailer which is sturdy in construction, one simple in structure, one economical to manufacture and assemble, and one having optimum utility for sportsmen and the like.

These and other objects and advantages of the present invention will be fully apparent from the following description when taken in connection with the annexed drawings, in which:

Figure 1 is a side elevational view of the camping and boat transporting trailer according to the present invention in a position of use with the camping equipment assembly and the boat secured upon the trailer in a condition for transport.

Figure 2 is a side elevational view of the trailer of the present invention with the boat removed therefrom and with the camping equipment assembly shown in full lines in a position prior to erection of the tent thereon, the dotted line showing indicating the elevated position of the tent floor with the unpacked equipment thereon.

Figure 3 is a side elevational view of the trailer with a portion of the forward end of the trailer broken away, the boat being shown mounted upon the trailer and the tent erected upon the tent floor.

Figure 4 is a fragmentary view, on an enlarged scale, taken on the line 4—4 of Figure 3.

Figure 5 is a sectional view taken on the line 5—5 of Figure 4.

Figure 6 is a sectional view seen along a longitudinal line of the tent floor.

Figure 7 is a fragmentary sectional view taken on the line 7—7 of Figure 6.

Figure 8 is an isometric view of the framework of the tent of the present invention.

Figure 9 is a sectional view, on an enlarged scale, taken on the line 9—9 of Figure 8.

Figure 10 is an exploded plan view of the elevating means used to shift the tent floor from the lowered position to the elevated position, a portion of the tongue of the trailer being broken away.

Figure 11 is an elevational view of the trailer of the present invention with the boat installed thereon and with the tent erected above the boat, and with a lean-to constructed to one side of the trailer using the camping equipment assembly cover for a shelter.

Figure 12 is an elevational view similar to Figure 11 showing the tent erected upon the trailer with the boat removed therefrom.

Figure 13 is an elevational view showing two of the trailers of the present invention used to construct a multiple tent having a central lean-to or canopy common to each trailer.

Referring in greater detail to the drawings in which like numerals indicate like parts throughout the several views, in Figures 1 to 3 and 11 to 13 the reference numeral 20 designates the camping and boat transporting trailer according to the present invention. The trailer 20 includes a tongue 22, side bars 24, wheels 26, and spring assemblies 28 connecting the wheels 26 to the side bars 24. The trailer 20 also includes an axle 30 and a rear cross member 32, as shown in Figure 12. The tongue 22, trailer side bars 24, spring assemblies 28, axle 30, and suitable cross members including the member 32 constitute a wheeled horizontally disposed frame having a forward end and a rearward end. The free end portion of the tongue 22 carries a trailer hitch 34 for attachment of the trailer 20 to a towing vehicle.

An upright boat 36 having a bow 38 and a stern 40 is removably supported upon the frame of the trailer 20 with the bow 38 adjacent the forward end of the trailer frame and the stern adjacent the rearward end of the frame.

The frame of the trailer 20 is provided with rear cradle members 42 and front cradle members 44 for support of the boat 36 with rollers 46 and 48 engaging the keel of the boat 36 and enabling the user thereof to remove the boat 36 rollably from the trailer 20.

A camping assembly 50, Figure 1, and including a horizontally disposed tent floor 52 is normally positioned so that the tent floor 52 is superimposed upon and rests upon the portion of the top of the boat 36 inwardly of and adjacent the stern 40. Means is provided by the present invention connecting the tent floor 52 to the frame of the trailer 20 for movement of the assembly 50 from the position in which the tent floor 52 rests upon the boat top to an elevated position shown in dotted lines in Figure 2 in which the assembly 50 is spaced above the top of the boat 36. Specifically this connecting means includes at least two U-shaped support members 54 and 56 arranged so that the bights thereof extend in transverse spaced relation across the side bars 24 of the trailer 20 intermediate the forward and rearward ends of the frame of the trailer 20 with the legs 58 and 60 of the support members 54 and 56, respectively, projecting in an upwardly sloping direction toward the rearward end of the frame of the trailer 20, the bight of the one support member 56 being shown in Figures 4 and 5 and designated generally by the reference numeral 62.

Means is provided connecting the bights of the support members 54 and 56 to the frame side bars 24 for swinging movement of the support members 54 and 56 from the position in which the legs 58 and 60 slope upwardly to the rear of the trailer 20 to a position in which the legs are substantially upright as shown in dotted lines in Figure 2. This means is shown in Figures 4 and 5 with respect to the bight 62 of the support member 56, the connection of the bight of the other support member 54 being identical and to be considered herein as fully described. This connection means includes a U-bolt 64 extending about the side bar 24 adjacent each end of a pillow block 66 carrying a short length of sleeve 68 which is circumposed about the adjacent portion of the bight 62 of the support member 56. A bearing cap 70 extends over the central portion of the pillow block 66 and is bolted thereto with cap screws 72 extending therethrough and extending through the sleeve 68 and into a slot 74 provided in the adjacent portion of the bight 62 for preventing lateral movement of the support member 56 relative to the side bars 24 of the frame of the trailer 20.

The camping assembly 50 includes an upstanding wall 76 extending about the perimeter of the floor 52 with the front and end sections of the wall 76 having attached thereto tent frame members 78 and 80, respectively. Hingedly secured at their lower ends to the adjacent sections of the wall 76 for movement from a nested position shown in Figure 6 to an upright position shown in Figure 8 over which the fabric of the tent is stretched and secured. Side bars 82 and a ridge pole 84, each having a telescoping inner section designated by the reference numeral 86 and shown in detail in Figure 9 with reference to the ridge pole 84, are used to support the frame members 78 and 80 in erected position spaced from each other and sufficiently rigid whereby the fabric of the tent is held in a taut condition.

In Figure 7 it will be seen that the leg 58 of the support member 54 has an inverted U-shaped hanger member 88 extending over its free end for attachment of the leg 58 to the adjacent portion of the frame side bars 24. A vertically arranged support 90 depends from the cross member 92 of the camping assembly 50 and is contoured on its lower end so as to abuttingly engage the adjacent portion of the gunwale of the boat 36, shown in dotted lines. Suitable padding 96 is used to protect the finish of the boat 36 where it is engaged by the support 90. Other supports 98 similarly support the forward end of the assembly 50 upon the top of the boat 36 forwardly of the support 90.

Holding means is dependingly carried by the tent floor 52 and is engageable with the frame of the trailer 20 for releasably retaining the camping assembly 50 in the position resting upon the top of the boat 36. This means is shown in Figure 1 and consists in a flexible chain 100 having a turn-buckle assembly 102 on its upper end operatively connected to the under side of the floor 52 and having its lower end connected by a suitable link means to the side bars 24 of the frame of the trailer 20. Although only one chain 100 is shown a chain is used on each side of the boat 36 for holding the camping assembly 50 in its position resting upon the top of the boat 36. The supports 90 and 98 constitute holding means dependingly carried by the tent floor 52 and are engageable with the top of the boat 36 or with the frame 20 when the camping assembly 50 is in the position with the tent floor 52 resting upon the top of the boat 36 as shown in Figure 1 or upon the frame of the trailer 20 as shown in Figure 2.

Braces 104 are attached to the upper end portions of each of the legs 58 and 60 of the support members 54 and 56, respectively, for retaining the tent floor 52 in its elevated position with the support member legs 58 and 60 in substantially the upright position, such position being slightly over center and relieving the strain upon the means which is provided for elevating the camping assembly 50 from the position shown in Figure 1 to the position shown in dotted lines in Figure 2. This means consists in a conventional winch 106 mounted upon the forward end of the trailer 20 and a cable 108 having a portion wound about the winch 106 and having one end fixedly attached to the tent floor 52. Other winch means as at 110 in Figure 2 is used to pull the boat 36 onto the trailer 20 when it is desired to transport the boat 36 over a roadway. In Figure 11 the fabric of the tent has been stretched upon the framework of the frame members 78 and 80 and the cover normally used to extend over the camping assembly 50 has been stretched from one side of the tent to an auxiliary tent pole 112, the cover being designated by the numeral 114. A rope 116 secures the cover 114 in the extended position.

In Figure 10 it will be seen that the winch 106 may be arranged with an intermediate portion of the cable 108 traveling over equalizing pulleys 116 fixed to the tent floor 52 so that the latter is drawn evenly on each side as it is pulled to the upwardly elevated position for freeing the boat 36 for removal thereunder from the body of the trailer 20.

In Figure 12 the boat has been removed and the tent erected upon the trailer 20 at a low elevation for the convenience of the user, the cover 114 again being used in conjunction with the auxiliary tent pole 112 and a tent rope 116 to form a canopy at one side of the trailer. In Figure 13 two trailers 20 have been assembled with a central canopy formed by two covers 114 and a third auxiliary tent pole 120 supporting the free ends of the covers 114 and forming a central canopy common to both of the trailers 20.

It will be seen from the foregoing description that the camping and boat transporting trailer according to the present invention forms a means by which the user may have a boat readily transportable over a roadway and a tent readily available for use with or without removing the boat from the trailer as desired. The tent of the trailer may be quickly and easily erected above the tent floor with either the tent floor resting upon the trailer or resting upon the boat with the boat in its position of transport on the trailer. In Figure 3 the reference numeral 122 designates a ladder formed in such shape as to be useful for entering and exiting from the tent mounted upon the tent floor 52, the tent being designated in this and other views by the reference numeral 124.

While only a preferred embodiment of the present invention has been shown and described other embodiments are contemplated and numerous changes or modifications may be made therein without departing from the spirit of the invention as set forth in the appended claims.

What is claimed is:

1. A camping and boat transporting trailer comprising a horizontally disposed wheeled frame having a forward end and a rearward end, means on the forward end of said frame for attachment of a towing vehicle, an upright boat having a bow and a stern removably supported on said frame with the bow adjacent the forward end of said frame and the stern adjacent the rearward end of said frame, a camping assembly including a horizontally disposed tent floor normally positioned so that said floor is superimposed upon and rests upon the portion of the top of said boat inwardly of and adjacent said boat stern, and means connecting said tent floor to said frame for movement of said camping assembly from the position in which said tent floor rests upon said boat top portion to an elevated position in which said camping assembly is spaced above the top of said boat, said boat being manually withdrawable from said frame when said camping assembly has been moved to the elevated position, and said camping assembly being movable upon withdrawal of said boat from said frame from the elevated position to a position in which said tent floor rests upon said frame.

2. A camping and boat transporting trailer comprising a horizontally disposed wheeled frame having a forward end and a rearward end, means on the forward end of said frame for attachment of a towing vehicle, an upright boat having a bow and a stern removably supported on said frame with the bow adjacent the forward end of said frame and the stern adjacent the rearward end of said frame, a camping assembly including a horizontally disposed tent floor normally positioned so that said floor is superimposed upon and rests upon the portion of the top of said boat inwardly of and adjacent said boat stern, means connecting said tent floor to said frame for movement of said camping assembly from the position in which said tent floor rests upon said boat top portion to an elevated position in which said camping assembly is spaced above the top of said boat, said boat being manually withdrawable from said frame when said camping assembly has been moved to the elevated position, and said camping assembly being movable upon withdrawal of said boat from said frame from the elevated position to a position in which said tent floor rests upon said frame, and means carried by said frame and releasably attached to said tent floor when the latter is in the position resting upon said boat top for retaining said camping assembly in said position.

3. A camping and boat transporting trailer comprising a horizontally disposed wheeled frame having a forward end and a rearward end, means on the forward end of said frame for attachment of a towing vehicle, an upright boat having a bow and a stern removably supported on said frame with the bow adjacent the forward end of said frame and the stern adjacent the rearward end of said frame, a camping assembly including a horizontally disposed tent floor normally positioned so that said floor is superimposed upon and rests upon the portion of the top of said boat inwardly of and adjacent said boat stern, means connecting said tent floor to said frame for movement of said camping assembly from the position in which said tent floor rests upon said boat top portion to an elevated position in which said camping assembly is spaced above the top of said boat, said boat being manually withdrawable from said frame when said camping assembly has been moved to the elevated position, and said camping assembly being movable upon withdrawal of said boat from said frame from the elevated position to a position in which said tent floor rests upon said frame, and holding means dependingly carried by said tent floor and engageable with said boat top or said frame when said camping assembly is in the position with said tent floor resting upon said boat top portion or said frame, respectively.

4. A camping and boat transporting trailer comprising a horizontally disposed wheeled frame having a forward end and a rearward end, means on the forward end of said frame for attachment of a towing vehicle, an upright boat having a bow and a stern removably supported on said frame with the bow adjacent the forward end of said frame and the stern adjacent the rearward end of said frame, a camping assembly including a horizontally disposed tent floor normally positioned so that said floor is superimposed upon and rests upon the portion of the top of said boat inwardly of and adjacent said boat stern, means connecting said tent floor to said frame for movement of said camping assembly from the position in which said tent floor rests upon said boat top portion to an elevated position in which said camping assembly is spaced above the top of said boat, said boat being manually withdrawable from said frame when said camping assembly has been moved to the elevated position, and said camping assembly being movable upon withdrawal of said boat from said frame from the elevated position to a position in which said tent floor rests upon said frame, and manually operable elevation means on said frame forward end and operatively connected to said tent floor for effecting the movement of the latter to the elevated position.

5. A camping and boat transporting trailer comprising a horizontally disposed wheeled frame having side bars and a forward end and a rearward end, means on the forward end of said frame for attachment of a towing vehicle, an upright boat having a bow and a stern removably supported on said frame with the bow adjacent the forward end of said frame and the stern adjacent the rearward end of said frame, a camping assembly including a horizontally disposed tent floor normally positioned so that said floor is superimposed upon and rests upon the portion of the top of said boat inwardly of and adjacent said boat stern, and means connecting said tent floor to said frame for movement of said camping assembly from the position in which said tent floor rests upon said boat top portion to an elevated position in which said camping assembly is spaced above the top of said boat, said boat being manually withdrawable from said frame when said camping assembly has been moved to the elevated position, and said camping assembly being movable upon withdrawal of said boat from said frame from the elevated position to a position in which said tent floor rests upon said frame, said means including at least two U-shaped support members arranged so that the bights extend in transverse spaced relation across said side bars intermediate the forward and rearward ends of said frame with the legs projecting in an upwardly sloping direction toward the rearward end of said frame, means connecting the bights of said support members to said frame side bars for swinging movement of the support members from the position in which the legs slope upwardly to a position in which the legs are substantially upright, said tent floor being connected to the free ends of said legs for movement with said support members.

References Cited in the file of this patent
UNITED STATES PATENTS

| | | |
|---|---|---|
| D. 158,875 | Lindig | June 6, 1950 |
| 2,669,480 | Messick et al. | Feb. 16, 1954 |